April 5, 1960

R. F. IAGER ET AL 2,931,431

FUEL BURNER AND IGNITER ARRANGEMENT

Filed Oct. 30, 1957

INVENTORS
Raymond F. Iager
William T. Hage

BY

*J. P. Moran*

ATTORNEY

April 5, 1960  R. F. IAGER ET AL  2,931,431
FUEL BURNER AND IGNITER ARRANGEMENT
Filed Oct. 30, 1957  3 Sheets-Sheet 2

INVENTOR.
Raymond F. Iager
BY William T. Hage

ATTORNEY

INVENTORS
Raymond F. Iager
William T. Hage
ATTORNEY

2,931,431
FUEL BURNER AND IGNITER ARRANGEMENT

Raymond F. Iager and William T. Hage, Alliance, Ohio, assignors to The Babcock & Wilcox Company, New York, N.Y., a corporation of New Jersey Application October 30, 1957, Serial No. 693,437

9 Claims. (Cl. 158—28)

This invention relates to a fuel burner and igniter arrangement for fluent fuel burners and, more particularly, to a novel hot wire igniter having means for maintaining the hot wire at a substantially constant temperature.

With the development of modern large size vapor generators and the corresponding increase in furnace sizes, manual lighting of the fluent fuel burners for these furnaces, as with torches or the like, has become impractical and hazardous. Consequently, these high capacity burners are usually lit by means of remotely controlled igniters such as electric sparking devices, squibs or fuses, or "hot wire" devices. Such remote control burner lighters or igniters are practically a necessity where the furnace is operated at superatmospheric pressures.

Where the main burners utilize liquid or gaseous fuel, the igniter is generally positioned to directly light the main burner. However, where the main burners utilize pulverized fuel, and in the case of some high capacity gaseous fuel burners, the "automatic" lighters or igniters are used to light a pilot burner, utilizing liquid or gaseous fuel, and this pilot burner initiates and maintains ignition of the main burner.

The most commonly used automatic or remote control igniter utilizes a high voltage spark to effect ignition. These igniters generally comprise a pair of suitably spaced electrodes arranged in operative relation to a combustible mixture discharged from a pilot or main burner. The electrodes are energized from a high voltage ignition transformer controlled, as to energization, by a push button on a control panel, for example. The continuous spark between the electrodes provides sufficient heat to ignite the fule-air mixture. In a practical installation, one of the electrodes is preferably grounded, but the other electrode is at a relatively high alternating current potential.

Despite the fact that these electric spark igniters provide satisfactory means for igniting a combustible mixture, they have numerous disadvantages from an operating standpoint. For example, carbon from the flame deposits on the electrodes eventually causing the electrodes to become shorted. The high voltage requires very bulky insulators for supporting the ungrounded electrode, and even with these insulators, there is danger of breakdown of the insulation due to the extremely high voltage employed. In addition, the requisite high voltage is hazardous to personnel who may possibly come in contact with bare high voltage leads, or with insulated leads having defective insulation. The ignition transformer required to provide the high voltage incorporates the large number of turns of very fine wire resulting in a transformer which is unduly delicate for the hard service conditions and therefore subject to failure in service. The heat from the windbox, or blow-back from the burner, scorches the insulation on the high voltage wire often causing a short circuit.

Another known difficulty is that of establishing or maintaining a spark under conditions of superatmospheric pressure. Generally, it is extremely difficult to establish or maintain a spark at pressures in excess of about 400 p.s.i. Theoretically, a spark can be established and maintained at a pressure of 600 p.s.i., but this would require a voltage of about 22,000 volts which further accentuates the problem of insulating the ungrounded electrode and problems due to breakdown of insulation. An incidental disadvantage is that there is no indication at the control panel showing the condition of the spark or whether or not the fuel mixture has been ignited, unless rather costly flame detector means are used, and these latter require considerable maintenance.

In view of these known operational difficulties with spark type igniters, it has been proposed to use a hot wire type of igniter in which heat for ignition is supplied by a resistance wire through which a current is caused to flow. Resistance wire ignition has certain advantages over spark type igniters in that a resistance wire type of igniter is not subject to malfunctioning due to fouling, as wet oil or carbon deposits on the resistance wire do not have an adverse effect on the operation of the latter. As a matter of fact, and in some cases, the presence of carbon or wet oil is a distinct advantage in that the carbon or wet oil will ignite from the heat of the wire and add to the total heat release for ignition purposes. A further advantage is that a low voltage, high amperage power supply is used with a hot wire type of igniter, for example, a voltage of about 5 volts. This automatically eliminates the hazards present with high voltage installations and requires an actual metal-to-metal contact to exist before a short circuit will occur, and thus eliminates any tendency to arc over. The low voltage supply makes it possible to use compact sealing devices in superatmospheric pressure installations. The hazards to personnel are substantially eliminated.

As a further advantage, hot wire types of igniters are not affected by pressure in the furnace and the power requirements and operating characteristics are the same at both atmospheric and superatmospheric pressures.

The foregoing potential advantages of hot wire igniters has led to attempts to use these igniters for furnace burners but, up to the present, these have not been satisfactory in practice. The principal reason is that hot wire type igniters previously used have been supplied with a constant current. Before ignition of the burner flame, the heat present in the resistance wire is radiated to the surrounding atmosphere which is relatively cool. However, as soon as the burner flame has been established in the vicinity of the resistance wire, the ambient temperature is raised very substantially so that there is no cooling effect on the hot wire by the surrounding atmosphere. As a result, the heat is "bottled up" in the hot wire and failure occurs due to overheating of the resistance wire, as the temperature thereof will increase very rapidly due to the inability for the heat to dissipate itself. In practice, such resistance type igniters have failed after only a very few operations.

In accordance with the present invention, it has been found that satisfactory ignition and long operating life with hot wire igniters can be obtained by maintaining the temperature of the resistance wire at a preset value. More specifically, a temperature sensing element, such as a thermocouple, is operatively associated with the resistance wire and is utilized to control or modulate the supply of current to the latter. The control signal from thermocouple, for example, may be applied to an indicator such as an ammeter, and observations of the ammeter reading utilized in manually operating a rheostat or other circuit controller to vary the current supply to the hot wire to maintain a constant temperature of the latter. Preferably, however, the control signal is applied to the input of an amplifier whose output is used to control the operation of a current modulator in the current supply system for the resistance wire. As a feature of the invention, long life of the operating parts is provided by utilizing a magnetic type amplifier between the thermocouple and the current controller for the resistance wire.

When it is desired to operate the igniter, a very heavy current is supplied to the resistance wire resulting in heating of the latter to a point sufficient to ignite the combustible mixture from the main or primary burner. As the flame is established, the resulting increase in temperature of the resistance wire results in the thermocouple providing a control signal which, properly amplified, automatically reduces the current flow through the resistance wire at a value such as to maintain the temperature of the resistance wire at a preset value. This marked decrease in the current supply to the resistance wire, when registered by an ammeter, can be used as an indication of the establishment and maintenance of a flame from the main burner. However, as an added safety feature, a second thermocouple is connected to the resistance wire in circuit with a meter to provide a direct indication of the temperature of the resistance wire.

For an understanding of the invention principles, reference is made to the following description of typical embodiments thereof as illustrated in the accompanying drawings.

Figure 1:
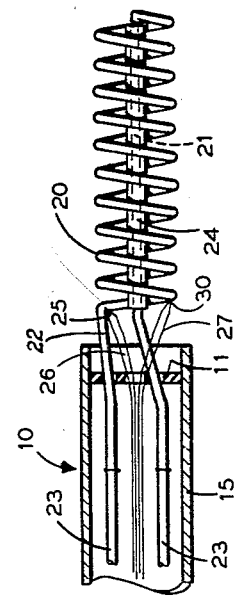
Fig. 1 is a longitudinal sectional view of a hot wire igniter embodying the invention.
Figure 1:
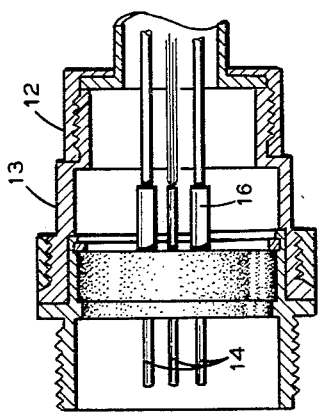
Figure 1:
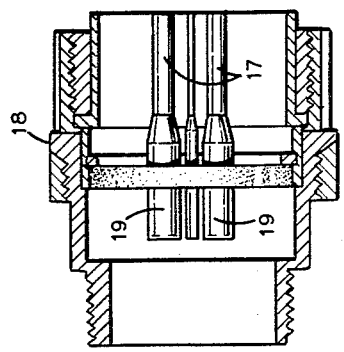

Referring to Fig. 1, a hot wire igniter 10 embodying the invention is illustrated as comprising an igniter coil 20 of high electrical resistance wire, such as an 80 Ni—20 Cr alloy ("Nichrome") wire. By way of illustrative example, coil 20 may be of No. 10 gage wire formed into a coil about two inches long and one-half inch in diameter. Leads 21, 22, of the same wire as coil 20, have their outer ends welded to the opposite ends of coil 20, and their inner ends brazed to copper supply wires 23 preferably of the same gage as the wire of coil 20. Lead 21 runs through a tubular insulator 24 within coil 20.

Leads 21, 22 extend through spaced apertures in an insulator 11 mounted in the inner end of an elongated metal tube 15 preferably formed of stainless steel, and the brazed joints between the ends of the leads 21, 22 and the ends of supply wires are preferably within tube 15. The outer end of tube 15 is flanged for engagement by a flanged ring 12 coupling tube 15 to a male connector element or plug 13 having multiple prongs 14 formed with wire receiving sockets 16 on their inner ends. The ends of supply lines 13 are electrically and mechanically secured into the sockets 16 of a pair of prongs 14. Prongs 14 are arranged to engage in receptacles 17 in a female connector element 18 securable to male element 13. Receptacles 17 have sockets 19 for receiving wires connecting the igniter to supply and control circuits.

In accordance with the principles of the invention, a thermocouple 25 is brazed, welded or otherwise fused to igniter coil 20 to provide a control signal representative of the temperature of coil 20. Leads 26 extend through insulator 11 to connect thermocouple 25 to the sockets 16 of a pair of prongs 14 of element 13 for electrically connecting the thermocouple to an ammeter or control system.

When the igniter is provided with an automatic temperature control, thermocouple 25 is used to provide the current controlling or modulating system and a second thermocouple 30 is fused to igniter coil 20. Thermocouple 30 is connected by leads 27 to the prongs 14 of element 13 for electrical connection to a millivoltmeter. The ammeter thus gives a visual indication of the temperature of coil 20. An ammeter connected in circuit between coil 20 and its current supply controller can be used to provide an indirect indication of the presence or absence of a flame, as the supply current will be automatically decreased when a heating flame from the main burner radiates heat to the igniter coil.

Figure 2:
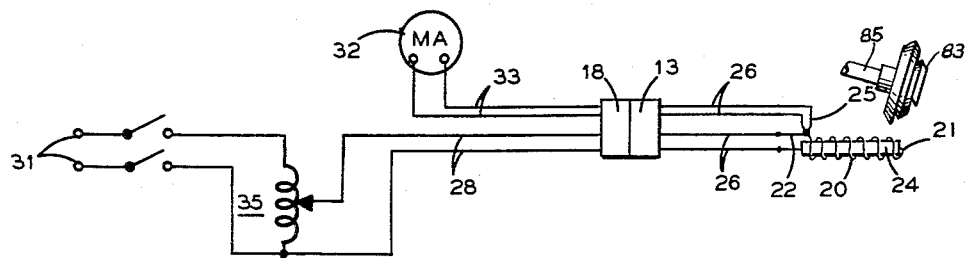
Fig. 2 is a schematic wiring diagram of a manual system for controlling the temperature of the igniter coil.

Referring to Fig. 2, which illustrates a simple manual control for the temperature of coil 20, leads 28 from female coupling element 18 connect igniter coil 20 to a source of electric potential at terminals 31. A current controller, such as a continuously adjustable autotransformer 35, is interposed between terminals 31 and coil 20. Thermocouple 25 is connected to a millivoltmeter 32 by leads 33 extending from coupling element 18.

In the arrangement of Fig. 2, potentiometer 35 is initially adjusted with millivoltmeter 32 indicating the desired pre-ignition temperature for coil 20. When the main burner is ignited, the ambient temperature around coil 20 will increase, decreasing the heat dissipation from the coil and correspondingly raising its temperature. The increased temperature, as measured by thermocouple 25, will be indicated by millivoltmeter 32. Potentiometer 35 is then readjusted to decrease the current supply to coil 20 until millivoltmeter 32 again indicates the desired temperature for the coil.

Figure 3:
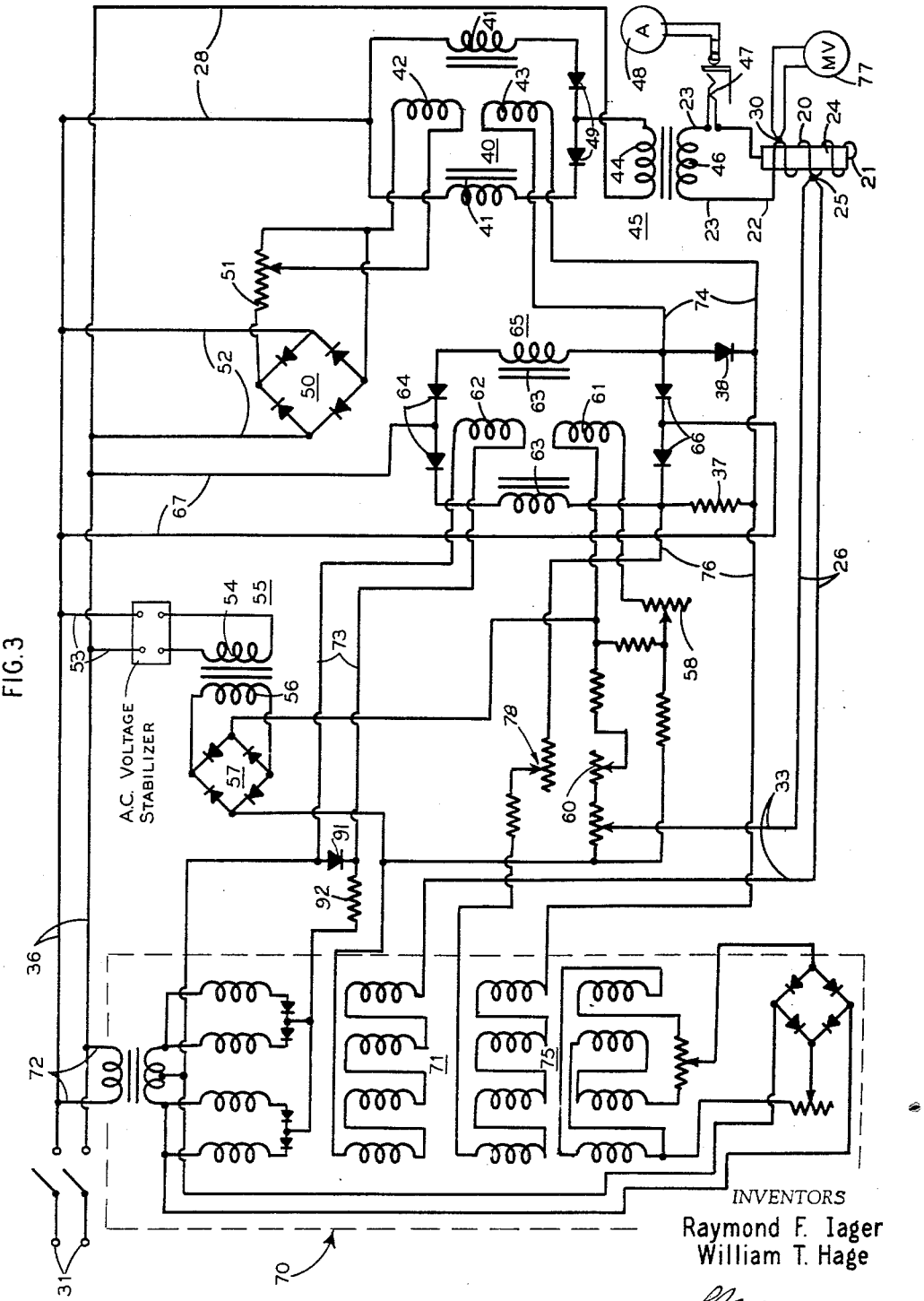
Fig. 3 is a schematic wiring diagram of an automatic temperature controller for the igniter.

However, while it is possible, by close observation of millivoltmeter 32 and corresponding adjustment of potentiometer 35, to manually maintain the temperature of coil 20 at the desired value within reasonably close limits, the temperature control can be more efficiently effected automatically, as by the automatic temperature control system of Fig. 3. This is a null balance system in which the control signal from thermocouple 25 is balanced against a steady preset voltage, and any differential between the control signal and the preset voltage is applied to a current controller for coil 20 in a sense such as to vary the supply current in a direction to restore the temperature of coil 20 to its preset value.

Referring to Fig. 3, terminals 31 have an A.C. potential of, for example, 115 volts applied thereto and are connected to main supply lines 36. Igniter supply lines 28 are connected to lines 36, and a current controller, in the form of a magnetic amplifier 40, has power coils 41 connected in one line 28, amplifier 40 having control coils or windings 42 and 43. Power coils 41 have their corresponding terminals connected to each other through series connected rectifiers 49, 49. Lines 28 are connected to the primary winding 44 of a transformer 45 whose secondary winding 46 is connected to supply lines 23. A series jack 47 is interposed in one line 23 for selective connection of an ammeter 48 thereinto. A resistor 37 and a rectifier 38 are connected in shunt with coil 43.

Control coil 42 has an adjustable fixed D.C. potential applied thereto by means of a potentiometer 51 connected across the output of a full-wave rectifier 50 supplied from lines 36 by conductors 52. Control coil 43 has a D.C. potential applied thereto proportional to the temperature of igniter coil 20, as will now be described.

Conductors 53 connect the primary winding 54 of a transformer 55 to supply lines 36, and secondary winding 56 of transformer 55 applies an A.C. potential across a full-wave rectifier 57. The D.C. output potential of rectifier 57 is applied to potentiometers 58 and 60 connected in substantially parallel relation with each other. Potentiometer 58 applies an adjustable D.C. potential to control coil or winding 61 of a magnetic amplifier 65 having a second control coil or winding 62. Power coils or windings 63 of amplifier 65 have their corresponding terminals connected to each other through series connected rectifiers 64 and 66. Conductors 67 connect the respective junction points of rectifiers 64 and 66 to supply lines 36.

Potentiometer 60 provides an adjustable fixed supplementary potential to augment the control signal from thermocouple 25 and to pre-set the desired temperature of igniter coil 20. The augmented control signal or potential is applied to the input section 71 of a magnetic amplifier 70 powered over conductors 72 connected to supply lines 36. Amplifier 70 is a commercial type regenerative or reflex magnetic amplifier. The direct current output of amplifier 70 is applied, by conductors 73, to control winding 62 of amplifier 65. A rectifier 91 is connected across conductors 73 and a resistor 92 is connected in series with one conductor 73.

Control winding 62 is connected to oppose control winding 61 so that the net effect of these two control windings on the power windings 63 of amplifier 65 is equal to the differential of the amplified thermocouple control signal potential of coil 62 and the adjustable fixed potential of coil 61. Conductors 74 apply this differential D.C. potential to control winding 43 of amplifier 40 where its control effect on power windings 41 is additive to the control effect thereon of control winding 42. Thus, the current flow to igniter coil 20 is modulated in accordance with the temperature of the igniter-coil as measured by thermocouple 25. When the temperature of coil 20 increases, the current supply thereto is reduced until the preset ignition coil temperature is reattained.

The null-balance arrangement involving balancing the amplified control signal potential against an adjustable fixed potential and utilizing the differential potential to control the current flow to the igniter coil 20 provides a very sensitive control of the temperature of the igniter coil. The sensitivity of control is further increased by reflex amplification. Thus, the differential responsive potential from power coils 63 is applied by conductor 76 to a second input section 75 of amplifier 70 to increase the sensitivity of response of the amplifier output to the control signal input. A potentiometer 78 is connected in one conductor 76 to adjust the value of potential applied to section 75.

Thermocouple 30 is connected to a millivoltmeter 77 to provide a visual indication of the temperature of igniter coil 20.

Figure 4:
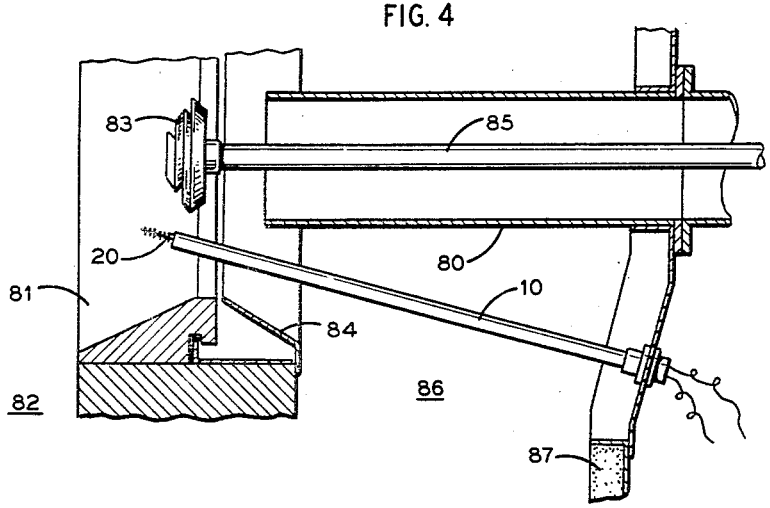
Fig. 4 is an elevation view, partly in section, of the igniter disposed in operative relation to a main fuel burner.

To provide a complete disclosure of the burner and igniter arrangement including the hot wire igniter 10, Fig. 4 illustrates the igniter in operative relation with a multiple fuel fired main burner. Referring to this figure, the main burner is illustrated as comprising a tube 80, arranged to discharge primary air and pulverized fuel through a burner port 81 of a furnace 82, and an oil atomizer assembly 85 arranged coaxially of tube 80 to discharge a combustible mixture of primary air and atomized oil through port 81. An impeller 83 is mounted on the discharge end of atomizer assembly 85 and a cone 84 directs secondary air from windbox 86 through the burner port.

Igniter 10 is suitably mounted through the outer wall 87 of windbox 86 for ready removal for inspection and/or replacement of parts. The axis of igniter 10 extends at an angle to that of the main burner assembly, with hot wire igniter coil 20 being in igniting relation to the combustible mixtures discharged from either of the main burners.

While specific embodiments of the invention have been shown and described in detail to illustrate the application of the invention principles, it will be understood that the invention may be embodied otherwise without departing from such principles.

What is claimed is:

1. A fuel burner and igniter arrangement comprising, in combination, a fuel burner; a high electrical resistance igniter element adjacent the discharge end of said fuel burner and arranged to be in igniting relation to a combustible mixture discharged therefrom, and subjected to elevated ambient temperatures resulting from burning of the combustible mixture; circuit means connecting said element to a source of electric potential; temperature sensitive means operatively associated with said element to provide a control signal proportional to the temperature of said element; and means, including a circuit controller operatively interposed between said source and said element, for controlling the current flow to said element in accordance with variations in said control signal to maintain the temperature of said element at a substantially constant value.

2. A fuel burner and igniter arrangement comprising, in combination, a fuel burner; a high electrical resistance igniter element adjacent the discharge end of said fuel burner and arranged to be in igniting relation to a combustible mixture discharged therefrom, and subjected to elevated ambient temperatures resulting from burning of the combustible mixture; circuit means connecting said element to a source of electric potential; temperature sensitive means operatively associated with said element to provide a control signal proportional to the temperature of said element; means, including a circuit controller operatively interposed between said source and said element and operatively connected to said temperature sensitive means, for controlling the current flow to said element in accordance with variations in said control signal to maintain the temperature of said element at a substantially constant value.

3. A fuel burner and igniter arrangement comprising, in combination, a fuel burner; an igniter element adjacent the discharge end of said fuel burner and of high electrical resistance wire arranged to be in igniting relation to a combustible mixture discharged therefrom, and subjected to elevated ambient temperatures resulting from burning of the combustible mixture; power supply means, including a source of electric potential, for maintaining a continuous flow of current through said element during operation of the main fuel burner means to maintain the temperature of said element at a pre-set value at least equal to the ignition temperature of the combustible mixture; and control means operatively associated with said element and said power supply means and operable, responsive to variations in the temperature of said element from said pre-set value, to modulate the flow of current through said element to maintain the element temperature substantially at such pre-set value.

4. A fuel burner and igniter arrangement comprising, in combination, a fuel burner; a high electrical resistance igniter element adjacent the discharge end of said fuel burner and arranged to be in igniting relation to a combustible mixture discharged therefrom, and subjected to elevated ambient temperatures resulting from burning of the combustible mixture; circuit means connecting said element to a source of electric potential; temperature sensitive means operatively associated with said element to provide a signal potential proportional to the temperature of said element; bias means connected to said source and adjustable to provide a bias potential; circuit means combining said signal potential and said bias potential in opposition to provide a control signal; and means, including a circuit controller operatively interposed between said source and said element, for controlling the current flow to said element in accordance with variations in said control signal to maintain the temperature of said element at a substantially constant value.

5. A fuel burner and igniter arrangement comprising, in combination, a fuel burner; a high electrical resistance igniter element adjacent the discharge end of said fuel burner and arranged to be in igniting relation to a combustible mixture discharged therefrom, and subjected to elevated ambient temperatures resulting from burning of the combustible mixture; circuit means connecting said element to a source of electric potential; temperature sensitive means operatively associated with said element to provide a signal potential proportional to the temperature of said element; an amplifier having an input connected to said temperature sensitive means for amplification of the signal potential; bias means connected to said source and adjustable to provide a bias potential; circuit means combining the amplified signal potential and said bias potential in opposition to provide a control signal; and means, including a circuit controller operatively interposed between said source and said element, for controlling the current flow to said element in accordance with variations in said control signal to maintain the temperature of said element at a substantially constant value.

6. A fuel burner and igniter arrangement comprising, in combination, a fuel burner; a high electrical resistance igniter element adjacent the discharge end of said fuel burner and arranged to be in igniting relation to a combustible mixture discharged therefrom, and subjected to elevated ambient temperatures resulting from burning of the combustible mixture; circuit means connecting said element to a source of electric potential; temperature sensitive means operatively associated with said element to provide a signal potential proportional to the temperature of said element; a reflex amplifier having an input connected to said temperature sensitive means for amplification of the signal potential; bias means connected to said source and adjustable to provide a bias potential; circuit means combining the amplified signal potential and said bias potential in opposition to provide a control signal; means for applying said control signal to an input of said amplifier for amplification thereof to increase the sensitivity of response to said signal potential; and means, including a circuit controller operatively interposed between said source and said element, for controlling the current flow to said element in accordance with variations in the amplified control signal to maintain the temperature of said element at a substantially constant value.

7. A fuel burner and igniter arrangement as claimed in claim 3 including a current measuring meter in operative association with said element to provide an indirect indication of the presence or absence of an ignited combustible mixture at the main fuel burner means.

8. A fuel burner and igniter arrangement as claimed in claim 2 including a second temperature sensitive means operatively associated with said element and connected to an indicating meter to provide an indication of the temperature of the igniter element.

9. A fuel burner and igniter arrangement as claimed in claim 2 in which said control means comprises a saturable reactor type magnetic amplifier having a power winding in series between said source and said element and a control winding having said control signal applied thereto.

References Cited in the file of this patent

UNITED STATES PATENTS

| | | |
|---|---|---|
| 1,834,289 | McCabe | Dec. 1, 1931 |
| 2,089,394 | McCabe | Aug. 10, 1937 |
| 2,404,841 | Hess et al. | July 30, 1946 |
| 2,606,544 | Church et al. | Aug. 12, 1952 |
| 2,752,473 | Hage | June 26, 1956 |